United States Patent [19]

Kreeger

[11] Patent Number: 4,687,100

[45] Date of Patent: Aug. 18, 1987

[54] REEL STORAGE CONTAINER

[75] Inventor: Elsmer W. Kreeger, Howell, Mich.

[73] Assignee: Pinckney Molded Plastics, Inc., Howell, Mich.

[21] Appl. No.: 804,284

[22] Filed: Dec. 4, 1985

Related U.S. Application Data

[63] Continuation of Ser. No. 677,919, Dec. 4, 1984, abandoned, which is a continuation-in-part of Ser. No. 627,678, Jul. 5, 1984, abandoned.

[51] Int. Cl.[4] .................... B65D 85/66; B65D 85/671
[52] U.S. Cl. .................................... 206/403; 206/408; 206/444; 220/339
[58] Field of Search ................. 220/339; 206/403, 404, 206/408, 444

[56] References Cited

U.S. PATENT DOCUMENTS 3,063,549  11/1962  Weichselbaum .
3,346,099  10/1967  Thomas et al. .
4,454,958   6/1984  Juillet et al. ..................... 220/339
4,501,361   2/1985  Rose, Jr. ........................... 220/339

Primary Examiner—Joseph Man-Fu Moy
Attorney, Agent, or Firm—Basile, Weintraub & Hanlon

[57] ABSTRACT

A container for storing reels upon which magnetic tape is wound. The container comprises a body and a cover which are integrally connected by means of a hinge which permits pivotal movement of the cover with respect to the body such that the cover may snap lockingly engage and enclose the mouth of the container to seal the contents of the storage container therein.

14 Claims, 10 Drawing Figures

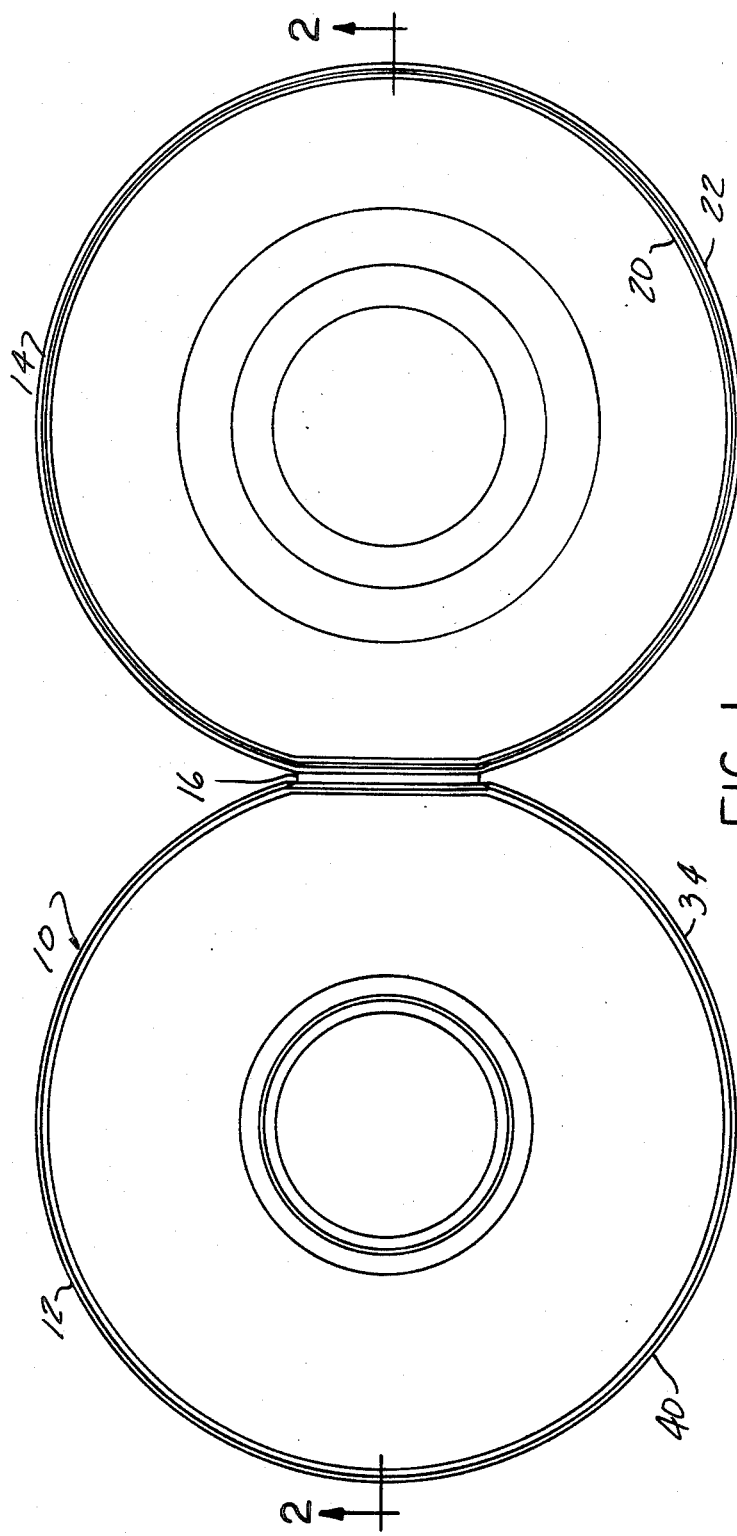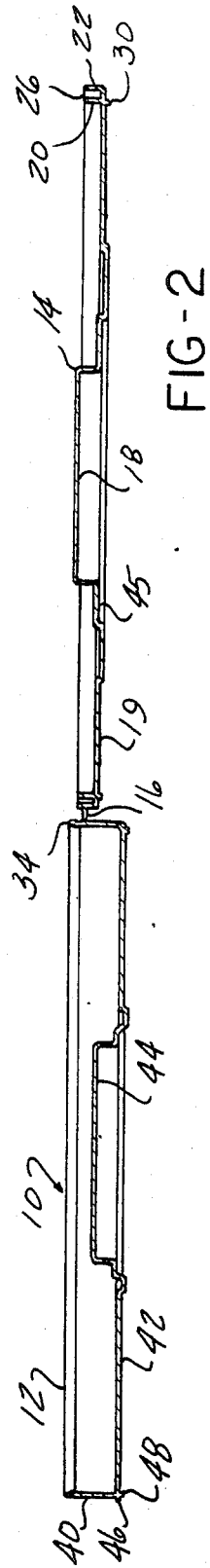

4,687,100

REEL STORAGE CONTAINER

CROSS-REFERENCE TO RELATED APPLICATION

The present invention is a continuation of co-pending U.S. patent application Ser. No. 677,919 filed Dec. 4, 1984 for a Reel Storage Container now abandoned which in turn is a continuation-in-part of Ser. No. 627,678 filed July 5, 1984 for a Reel Storage Container which is now abandoned.

BACKGROUND OF THE INVENTION

1. Field of the Invention

The present invention relates to the storage of reels of the type that have record-bearing media and, more particularly, to a container for storing such reels in a dust-free and moisture-proof environment.

2. Description of the Prior Art

Data processing commonly requires the extensive use of record-bearing media, such as magnetic tapes. Such tapes are commonly wound on individual spools or reels which are normally individually stored in reel containers adapted for compact storage and swift retrieval. An example of a reel tape storage container is disclosed in U.S. Pat. No. 3,323,847 as comprising a molded plastic body having a cylindrical core secured between side flanges between which the magnetic tape is wound. The spool or reel is enclosed in a supplemental carrier formed of a molded plastic body having opposing shaped plates which form a casing around the reeled tape. U.S. Pat. Nos. 3,310,178 and 3,696,935 recognize that a conservation of storage space may be had by exploiting the spool of the tape as part of the protective enclosure for its contents without the necessity of a separate container or case. This is accomplished by enclosing and stiffening the normally opened periphery of a reel having a record-bearing medium with a flexible band having a special form of latch on its exterior. The band is desirably of a material which is stretchably drawn around the periphery of the reel to provide a relatively dust-proof seal. The latch which draws the band over the periphery of the reel is of a relatively nonstretchable material which tends to maintain the fastness of a seal.

Other prior art patents of which Applicant is aware are U.S. Pat. Nos. 3,063,549; 3,346,099; 2,958,439; 3,485,416; 4,082,201; 4,127,189 and 4,314,651.

In today's modern economy the use of data processing requires the need for long-term storage of magnetic tapes numbering in the millions. It is essential in the storage of such magnetic tapes that the same be kept in a dust-free and water-proof environment. To ensure the integrity of stored tapes, it is common in many facilities to constantly remove stored tapes to test the same to ensure that the integrity of the tapes has been maintained and that the information stored thereon is safe for future use. To the knowledge of the Inventor, no one has devised a reel storage container which will safely maintain a magnetic tape wound about a reel in a safe, moisture-free environment wherein the container for so doing can be manufactured on a high-volume basis at a moderately low cost.

SUMMARY OF THE INVENTION

The present invention, which will be described subsequently in greater detail, comprises a reel storage container fabricated from a plastic material and including a cover which is integrally hinged to the container and movable between a first open position and a second closed, snap-on position wherein the cover is capable of effecting a hermetical sealing joint with the mouth of the container.

It is therefore an object of the present invention to provide a new and improved container for the storage of reels mounting magnetic tapes.

It is a further object of the present invention to provide such a container which is fabricated from a plastic material wherein the container is simple and inexpensive to manufacture.

It is a further object of the present invention to provide a container having an integral cover which sealingly engages the container to prevent the entry of dust and/or water vapor, thereby providing a secure environment for the magnetic tape stored therein.

Other objects, advantages and applications of the present invention will become apparent to those skilled in the art of manufacturing reel storage containers when the accompanying description of several examples of the best modes contemplated for practicing the present invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is a top plan view of one example of an integral storage container and cover with the cover being illustrated in an open position;

FIG. 2 is a cross-sectional view taken along line 2—2 of FIG. 1;

DESCRIPTION OF THE PREFERRED EMBODIMENTS

Figure 3:
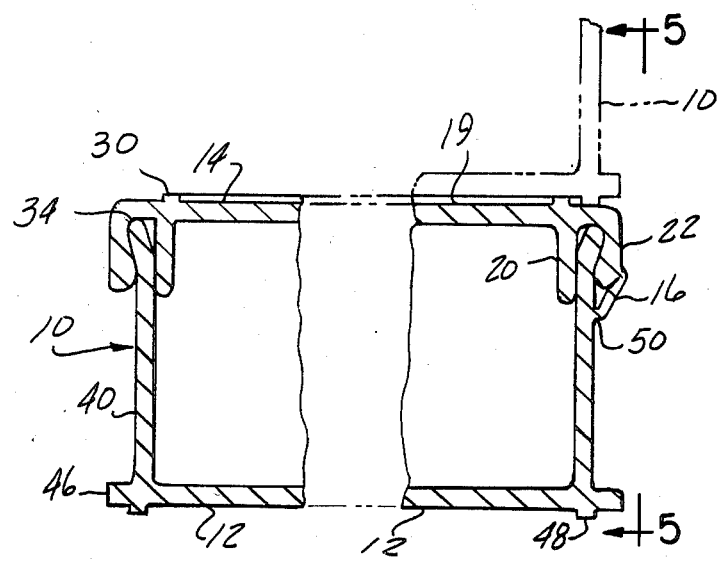
FIG. 3 is an enlarged, fragmentary, cross-sectional view similar to FIG. 2 with the cover being illustrated in a closed position on top of the container.

Referring now to the drawings and, in particular, to FIGS. 1 and 2 wherein there is illustrated one example of the present invention in the form of a magnetic tape reel storage container 10 comprising a body 12 integrally connected to a cover 14 by means of a hinge member 16. While other materials may be used in the fabrication of the storage container 10, the preferred material is a plastic, such as polypropylene.

Figure 4:
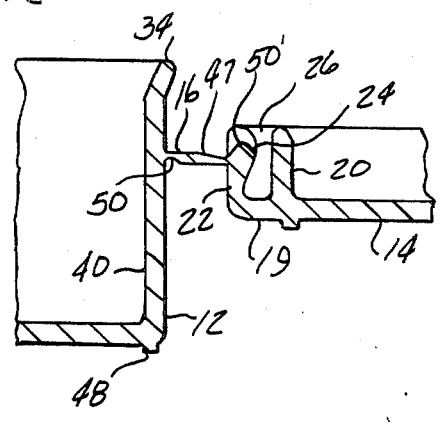
FIG. 4 is an enlarged, fragmentary view of FIG. 2 illustrating the hinge connection between the cover and the container.
Figure 5:
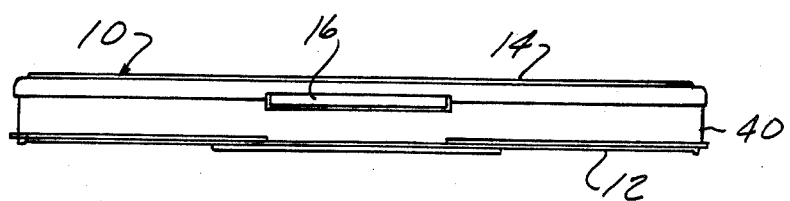
FIG. 5 is an end view of the hinge connection between the cover and the container as seen from line 5—5 of FIG. 3.

As can best be seen in FIGS. 2 and 4, the cover 14 comprises a depressed central wall 18 integrally joined to a raised, inverted, groove-type rim having a top wall 19, an inner groove wall 20 and an outer peripheral wall 22 defining a groove 26. The outer peripheral wall 22 has an enlarged or thickened mid-section 24 that narrows the width of the groove 26. The inner groove wall 20, the outer peripheral wall 22 and the groove 26 extend the full 360° about the cover 14. The top wall 19 of the cover 14 has an annualar raised projection 30, the purpose of which will be described hereinafter.

The thickened mid-section 24 combined with the rim top wall 19 defines the inner face of the peripheral wall 22 as being preferably rounded to accommodate for hermetical sealing therewith the outwardly flared circular body lip 34 and rounded edge thereof. The body 12 is cup shaped having a peripheral wall 40 that terminates in the outwardly flared body lip portion 34 defining the mouth of the body 12. The circular wall 40 has an integral bottom wall 42 which in turn has a recessed mid-section 44 (FIG. 2). The recessed mid-section 44 of the body 12 and the recessed section 16 of the cover 14 define reel engaging flanges adapted to center and secure the reel in place when the cover 14 is closed upon the body 12 as described hereinafter.

The recessed mid-section 44 terminates in a raised annular lip which matingly and stackingly engages a corespondingly formed annular recess 45 formed in the cover 14.

As can best be seen in FIG. 3, the lower portion of the body 12 is provided with an annular rim 46 which adds strength and rigidity to the body 12 while an annular leg extension 48 disposed near the peripheral edge of the bottom wall 42 cooperates with the aforementied annular rim 30 on the cover 14 to permit stacking of the closed containers 10, one upon the other, as illustrated in phantom lines in FIG. 3. The annular rim 30 on the cover 14 laterally abuts the interior wall of the annular leg extension 48 and prevents lateral movement of the stacked containers 10. It should be noted that the annular rim 46 terminates on either end of the hinge member 16.

Referring now to FIG. 4 for a detailed description of the hinge member 16 connecting the cover 14 to the container body 12, it can be seen that the hinge member 16 is essentially in an elongated flat strip of plastic material which in the typical embodiment is approximately 3 inches in length and ¼ inch wide, being integrally attached to the peripheral wall 40 of the container body 12 immediately below the container lip 34 and to the outside surface of the peripheral wall 22 of the cover 14 at a position adjacent the intermediate thickened section 24.

The lower surface of the hinge 16 immediately adjacent the outside surface of the peripheral wall 40 is provided with a ball cut 50 that runs the full length of the hinge 16. The ball cut 50 results in a straight-line hinge along which the hinge member 16 will pivot. The use of a ball cut eliminates any sharp edges along the length of the hinge member 16, thereby providing a hinge point which will not have any tendency to break after extended periods of use.

It should be noted that the top surface of the hinge member 16 is inclined downwardly and narrows for a substantial portion 47 of the width of the hinge 16 toward its point of integral attachment with the outside surface of the peripheral wall 22. The purpose of the flattened portion 47 of the hinge member 16 over a greater width thereof eliminates a predetermined bending line whereby the hinge member 16 will rotate and bend about whatever portion of the hinge portion 47 that is necessary to facilitate bending and which is least likely to damage the hinge member 16 over extended periods of use.

It should be noted that the top surface, as viewed in FIG. 4 of the drawings, of the peripheral wall 22 is recessed and narrowed at its upper end 50' along the length of the wall 22 that corresponds to the full length of the hinge member 16. This permits the cover 14 to roll over into the locked position illustrated in FIG. 3. By reason of the structure described, the cover 14 is able to be forcibly lifted over the lip 34 of the body 12 and snapped in place by progressive engagement of the inner face of the wall 22 and the outer surface of the body lip 34, coupled with the fact that the inner groove wall 20 abuttingly and sealingly engages the inside surface of the body peripheral wall 40 below the flared lip 34, thereby sandwiching the lip 34 snugly and securely between the opposing inner surfaces of the groove walls 20 and 22, providing for double annular seals 360° about the annular groove 26.

Referring now to FIGS. 6 through 10 wherein there is illustrated a second example of the present invention in the form of a magnetic tape reel storage container 100. The container 100 is substantially identical to the container 10 described hereinbefore and comparable components are identified by the same numeral in both embodiments.

Figure 6:
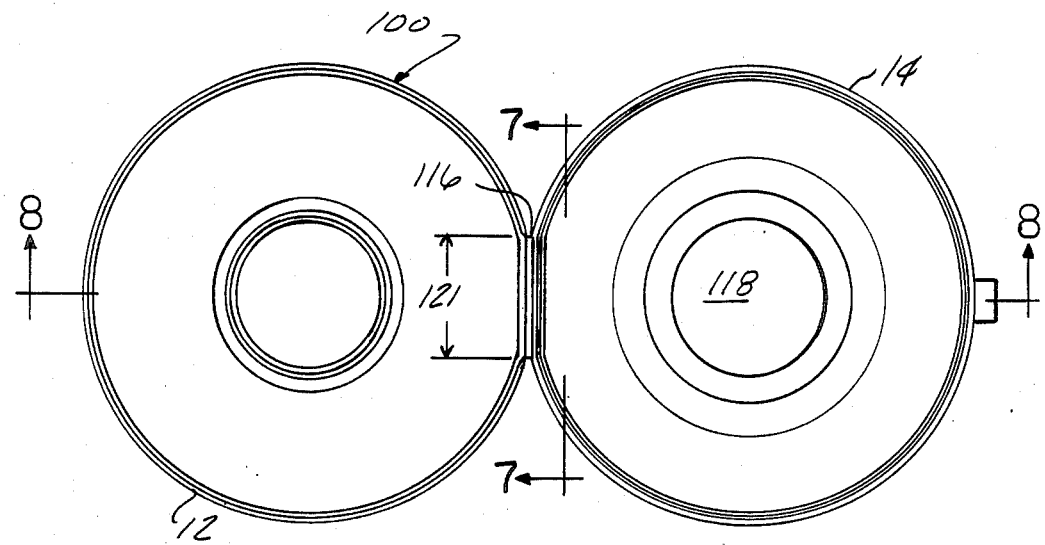
FIG. 6 is a top plan view on a reduced scale of a second example of an integral storage container and cover with the cover being illustrated in an opened position.
Figure 7:
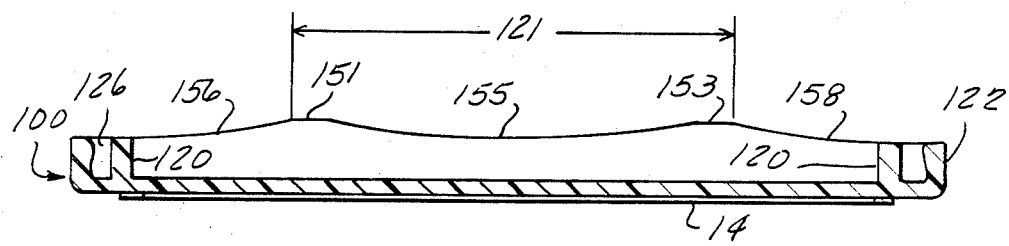
FIG. 7 is a fragmentary, cross-sectional view taken along line 7—7 of FIG. 6.
Figure 10:
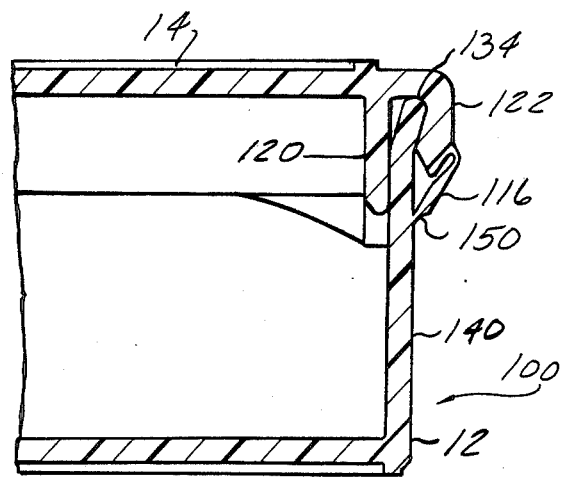
FIG. 10 is an enlarged, fragmentary, cross-sectional view similar to FIG. 8 with the cover being illustrated in a closed position on top of the container.
Figure 8:
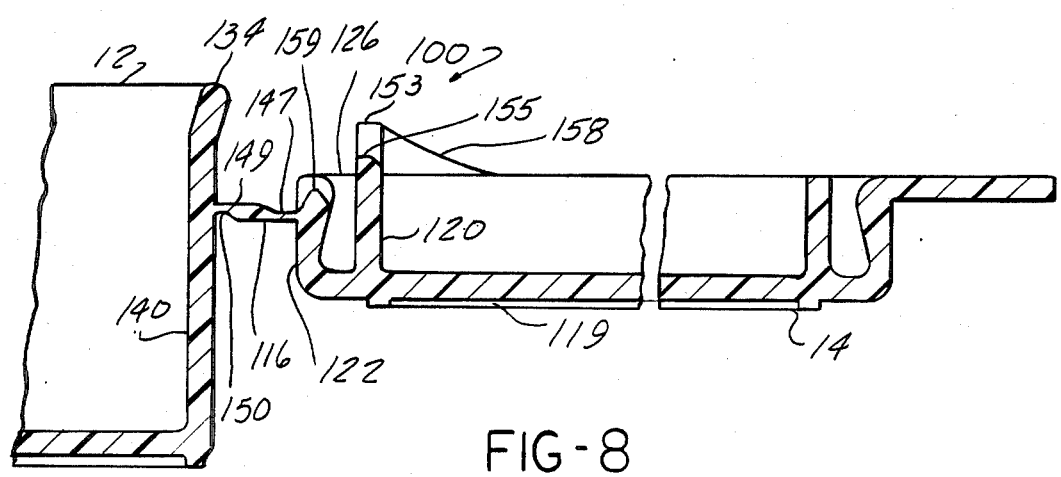
FIG. 8 is an enlarged, fragmentary, cross-sectional view taken along line 8—8 of FIG. 6 with the cover being illustrated in an opened position for illustrating the hinge connection between the cover and the container.

As can best be seen in FIGS. 6, 7 and 8, the storage container 100 comprises a body 12 integrally connected to a cover 14 by means of a hinge member 116. The cover 14 comprises a depressed central wall 118 (FIG. 6) integrally joined to a raised, inverted, grooved-type rim having a top wall 119 defining a groove wall 120 and an outer peripheral wall 122 defining a groove 126. The outer peripheral wall 12 has an enlarged or thickened midsection 124 that narrows the width of the groove 126 (FIG. 8). The inner groove wall 120, the outer peripheral wall 122 and the groove 126 extend the full 360° about the cover 12.

The thickened midsection 124 on the inner face of the peripheral wall 122 is preferably rounded to accommodate for hermetical sealing with an outer flared circular body lip 134 formed on the outer peripheral wall 140 of the body 12. The body 12 of the container 100 is cup-shaped having a peripheral wall 140 that terminates in the aforementioned outwardly flared body lip portion 134 defining the mouth of the body 12.

Referring now to FIGS. 6, 7 and 8, it can be seen that the hinge member 116 connecting the cover 14 to the body 12 is essentially an elongated flat strip of plastic material that is integrally attached to the peripheral wall 40 of the container body 12 immediately below the container lip 34 and to the outside surface of the peripheral wall 122 of the cover 14 at a position adjacent the intermediate thickened section 14.

The lower surface of the hinge 116 immediately adjacent the outer surface of the peripheral wall 40 is provided with a ball cut 150 that runs the full length of the hinge 116. The ball cut 150 results in a straight-line hinge along which the hinge member 116 will pivot. The use of a ball cut eliminates any sharp edges along the length of the hinge member 116, thereby providing a hinge point which will not have any tendency to break after extended periods of use.

The top surface of the hinge member 116 is inclined downwardly along its mid portion 149 and terminates in a uniformly narrowed portion 147 (FIG. 8). Thus, as can best be seen in FIG. 8, the hinge member 116 has a ball cut adjacent the peripheral wall 140, a thickened midsection 149, a tapered section and a uniformly narrowed portion 147 adjacent the peripheral wall 122. The narrowed portion 147 eliminates any predetermined bending line, such that the hinge member 116 will rotate and bend about whatever section of the hinge portion 147 is necessary to facilitate bending and which is least likely to damage the hinge member 116 over extended periods of use.

Still referring to FIGS. 7 and 8, it can be seen that the peripheral wall 122 is recessed and narrowed at its upper edge 159 along the length of the wall 122 that corresponds to the full length of the hinge member 116. It can also be seen that the corresponding length 121 of the grooved wall 120 extends upwardly beyond the height of the remaining portions of the grooved wall 122. The grooved wall length 121 is elevated at a maximum amount at locations 151 and 153 which correspond to the opposite ends of the length of the hinge member 116. The length 121 of wall 120 has an intermediate portion 155 that is concaved downwardly between locations 151 and 153. The wall 120 also includes upwardly tapered sections 156 and 158 on opposite sides of the locations 151 and 153, respectively. As indicated hereinbefore, the length of the grooved walls 120 and 122 that correspond with the length of the hinge member 116 as well as the corresponding length of the wall 140 follows a substantial straight line providing a simple means for hinging the cover 14 to the body 12.

Figure 9:
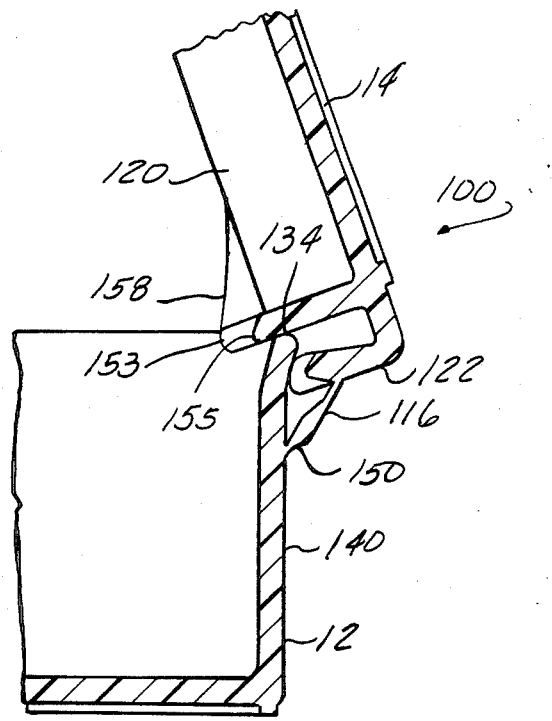
FIG. 9 is an enlarged, fragmentary, cross-sectional view similar to FIG. 8 illustrating the cover in an intermediate position.

As can be seen in FIG. 9, when the cover 14 is rotated counterclockwise (as viewed in FIGS. 8 and 9), the elevated sections 151 and 153 of the grooved wall 122 pass over the lip 134 of the body wall 140 guiding the lip 134 into the groove 126. By providing the recessed upper edge 159, the cover 14 is able to pivot around the lip 134 with a minimum amount of projection of the wall 120 into the interior of the body 12. This minimizes the amount of possible interference between the wall 120 and the computer tape that is stored within the container body 12 when the cover 14 is in the closed position illustrated in FIG. 9.

As can best be seen in FIGS. 6 and 8, the peripheral portion of the cover 14 diametrically opposed from the hinge member 116 is provided with a tab 160 which permits the user of the container to grasp the cover 14 and rotate the wall 122 outwardly to facilitate the disengagement of the cover 14 from the body 12.

It can thus be seen that the present invention provides a new and improved and simply designed container for storing reels upon which magnetic tapes are wound.

It should be understood by those skilled in the art of containers of the type disclosed herein that other forms of such containers may be had, all coming within the spirit of the invention and the scope of the appended claims.

What is claimed is:

1. In a container for storing tape reels in a sealed environment, a pair of open-mouthed, relatively stiff, engageable, circular, hollow members, one of said members at its mouth having a peripheral edge and the other of said members at its mouth having a peripheral edge receiving groove to removably and frictionally engage said edge; the improvement comprising:

a hinge member having an upper and lower surface thereon integrally connecting a selected length of the outer peripheral portions of each of said members such that said other member is rotatable with respect to said first member from a first disengaged position to a second position wherein said other member groove engages said edge, said hinge member having a ball cut on its lower surface along its entire length at a portion immediately adjacent the peripheral portion of said one member defining a first hinge line for permitting said hinge member to rotate about said first hinge line toward and away from said one member, thereby providing a hinge point characterized by an absence of sharp edges and the ability to resist breakage over extended periods of use, said hinge member having an inclined surface portion on its upper surface tapering the upper surface toward the lower surface along its length at a portion immediately adjacent the peripheral portion of said other member defining a hinge surface for permitting said other member to rotate about a section of said hinge surface toward and away from said mouth of said one member to facilitate bending and to reduce wear on the hinge member over extended periods of use, said hinge surface contacting a curved edge of said groove on said other member while in said second position.

2. The container defined in claim 1 wherein the thickness of said hinge member is reduced from a point immediately adjacent said other member a sufficient distance along the width of said hinge to permit flexing of said hinge member at a location which is dependent upon the positioning of said other member onto said one member.

3. The container defined in claim 1 wherein the outer peripheral wall of said other member defines the outer wall of said groove, said peripheral wall having a uniform height throughout its entire circumferential length, the portion of said groove outer wall associated with the selected length of said outer peripheral portion of said other member being reduced in its height by an amount sufficient to permit the passage of said associated length of said last-mentioned wall by the corresponding portion of said one member edge associated with said selected length of said hinge.

4. The container defined in claim 1 wherein said first and second members have outer peripheral portions which are of a uniform, circular periphery, the portions of said outer walls associated with said selected length of said outer peripheral portions of said members being non-circular and generally paralleling said first and second hinge lines, respectively of said peripheral portions of said first and second members.

5. The container defined in claim 1 wherein said edge is formed by an outward flare of an integral, circular, peripheral wall, said groove of said second member being defined by an inner first wall and an outer second wall joined at one end thereof, the second wall having an intermittent bulge located at the end of the groove opposite the joined end thereby reducing the size of said groove between said inner and outer walls and defining a flared surface on the interior of said outer wall, said outer wall snugly engaging a parallel portion of said one member circular wall when said edge is received in said groove, the outer portion of said flared surface snugly engaging said flared surface formed on said groove outer wall, providing a seal between said aforementioned engaged surfaces.

6. A container for storing computer tapes in a sealed environment, said container comprising:

a pair of open-mouthed, relatively stiff, engageable, circular, hollow members, one of said members at its mouth having a peripheral edge and the other of said members at its mouth having a peripheral edge receiving groove to removably and functionally engage said edge;

a hinge member integrally connecting a selected length of the outer peripheral portion of each of said members such that said other member is rotatable from a first disengaged position to a second position wherein said one member edge engages said other member groove, said edge being formed by an outward flare of an integral, circular, peripheral wall, said groove of said other member being defined by an inner first wall and an outer second wall joined at one end thereof, the second wall having an intermittent bulge located near the end of the groove opposite the joined end thereby reducing the size of said groove between said inner and outer walls and defining a flared surface on the interior of said outer wall, said outer wall snugly engaging a parallel portion of said one member circular wall when said edge is received in said groove, the outer portion of said edge flared surface snugly engaging said flared surface formed on said groove outer wall, providing sealed engagements between said aforementioned engaged surfaces, said outer wall having a curved edge opposite the joined end and adjacent the selected length of the outer peripheral portion; and said hinge member having an upper and lower surface thereon, a ball cut on its lower surface along its entire length at a portion immediately adjacent the peripheral portion of said one member defining a first hinge line for permitting said hinge member to rotate about said first hinge line toward and away from said one member, and an inclined surface portion on its upper surface tapering the upper surface toward the lower surface along its entire length at a portion immediately adjacent the peripheral portion of said other member defining a hinge surface for permitting said curved edge of said other member to rotate about a section of said hinge surface as said members move between said first and second positions.

7. In a container for storing tape reels in a sealed environment, a pair of open-mouthed, relatively stiff, engageable, circular, hollow members, one of said members at its mouth having a peripheral edge and the other of said members at its mouth having a peripheral edge receiving groove to removably and frictionally engage said edge; the improvement comprising:

a hinge member integrally connecting a selected length of the outer peripheral portions of each of said members such that said other member is rotatable with respect to said first member from a first disengaged position to a second position wherein said other member groove engages said edge, said hinge member comprising an elongated rectangular strip having one lengthwise edge integrally connected to said one member, the other of said lengthwise edge being connected to an outer wall of said peripheral edge receiving groove, the inner wall of said receiving groove having an elevated section generally corresponding to the length of said hinge, said elevated section overlying said one member peripheral edge as said other member is rotated with respect to said one member so as to guide said peripheral edge of said one member into said other member groove, the outer wall of said peripheral edge receiving groove having a curved edge adjacent the selected length of the outer peripheral portion of said other member, said hinge member having an upper and lower surface thereon, a ball cut on its lower surface along its entire length at a portion immediately adjacent the peripheral portion of said one member defining a first hinge line for permitting said hinge member to rotate about said first hinge line toward and away from said one member, and an inclined surface portion on its upper surface tapering the upper surface toward the lower surface along its length at a portion immediately adjacent the peripheral portion of said other member defining a hinge surface for permitting said curved edge of said other member to rotate about a section of said hinge surface as said members move between said first and second positions.

8. The container defined in claim 7 wherein the outer peripheral wall of said other member defines the outer wall of said groove, said peripheral wall having a uniform height throughout its entire circumferential length, the portion of said groove outer wall associated with the selected length of said outer peripheral portion of said other member being reduced in its height by an amount sufficient to permit the passage of said associated length of said last-mentioned wall by the corresponding portion of said one member edge associated with said selected length of said hinge.

9. The container defined in claim 7 wherein said first and second members have outer peripheral portions which are of a uniform, circular periphery, the portions of said outer walls associated with said selected length of said outer peripheral portions of said members being non-circular and generally paralleling said first and second hinge lines, respectively of said peripheral portions of said first and second members.

10. The container defined in claim 7 wherein said edge is formed by an outward flare of an integral, circular, peripheral wall, said groove of said second member being defined by an inner first wall and an outer second wall joined at one end thereof, the second wall having an intermittent bulge located at the end of the groove opposite the joined end thereby reducing the size of said groove between said inner and outer walls and defining a flared surface on the interior of said outer wall, said outer wall snugly engaging a parallel portion of said one member circular wall when said edge is received in said groove, the outer portion of said flared surface snugly engaging said flared surface formed on said groove outer wall, providing a seal between said aforementioned engaged surfaces.

11. A container for storing computer tapes in a sealed environment, said container comprising:

a pair of open-mouthed, relatively stiff, engageable, circular, hollow members, one of said members at its mouth having a peripheral edge and the other of said members at its mouth having a peripheral edge receiving groove to removably and functionally engage said edge;

a hinge member integrally connecting a selected length of the outer peripheral portion of each of said members such that said other member is rotatable from a first disengaged position to a second position wherein said one member edge engages said other member groove, said edge being formed by an outward flare of an integral, circular, peripheral wall, said groove of said other member being defined by an inner first wall and an outer second wall joined at one end thereof, the second wall having an intermittent bulge located at the end of the groove opposite the joined end thereby reducing the size of said groove between said inner and outer walls and defining a flared surface on the interior of said outer wall, said outer wall snugly engaging a parallel portion of said one member circular wall when said edge is received in said groove, the outer portion of said edge flared surface snugly engaging said flared surface formed on said groove outer wall, providing sealed engagements between said aforementioned engaged surfaces, said outer second wall having a curved edge opposite the joined end and adjacent the selected length of the outer peripheral portion; and said hinge member comprising an elongated rectangular strip having one lengthwise edge integrally connected to said one member, the other of said lengthwise edge being connected to an outer wall of said peripheral edge receiving groove, the inner wall of said receiving groove having an elevated section generally corresponding to the length of said hinge, said elevated section overlying said one member peripheral edge as said other member is rotated with respect to said one member so as to guide said peripheral edge of said one member into said other member groove, said hinge member having an upper and lower surface thereon, a ball cut on its lower surface along its entire length at a portion immediately adjacent the peripheral portion of said one member defining a first hinge line for permitting said hinge member to rotate about said first hinge line toward and away from said one member, and an inclined surface portion on its upper surface tapering the upper surface toward the lower surface along its length at a portion immediately adjacent the peripheral portion of said other member defining a hinge surface for permitting said curved edge of said other member to rotate about a section of said hinge surface as said members move between said first and second positions.

12. In a container for storing tape reels in a sealed environment, a pair of relatively stiff, engageable, circular, hollow members, the first of said members at its mouth having a peripheral edge and the second of said members at its mouth having a peripheral edge receiving groove to removably and frictionally engage said peripheral edge; the improvement comprising:

a hinge member having an upper and lower surface thereon integrally connecting a selected length of the outer peripheral portions of each of said members such that said other member is rotatable with respect to said first member from a first disengaged position to a second position wherein said other member groove engages said edge, said hinge member having a ball cut on its lower surface along its entire length at a portion immediately adjacent and essentially parallel to the peripheral portion of said one member defining a first hinge line for permitting the hinge member to rotate about the first hinge line toward and away from said one member, thereby providing a hinge point characterized by an absence of sharp edges and the ability to resist breakage over extended periods of use, the hinge member further having an inclined surface portion on its upper surface tapering the upper surface toward the lower surface along its length at a portion immediately adjacent and essentially parallel to the peripheral portion of said second member forming a second hinge position for permitting said second member to rotate toward and away from said mouth of said first member to facilitate bending and to reduce wear on the hinge member over extended periods of use, said inclined surface portion contacting a curved edge of said other member groove while in said second position.

13. The container defined in claim 12 wherein the tapering thickness of the hinge member is reduced from a point immediately adjacent the concavely reduced thickness adjacent to said first member a sufficient distance along the width of the hinge to permit flexing of the hinge member at a position depending upon the positioning of said second member onto said first member.

14. The container defined in claim 12 wherein said second member has an outer peripheral wall and an inner groove wall forming said peripheral edge receiving groove, the peripheral wall having a uniform height throughout its entire circumferential length, the peripheral wall further having a thickened mid-section on its interior face and a narrowing upper end, the portion of the inner groove wall associated with the selected length of said peripheral edge portion of said second member being reduced in its height by an amount sufficient to permit the passage of the associated length of the inner groove wall by the corresponding portion of the peripheral edge of the first member associated with said selected length of said hinge.

* * * * *